US011104309B2

(12) United States Patent
He et al.

(10) Patent No.: US 11,104,309 B2
(45) Date of Patent: Aug. 31, 2021

(54) FORK-ARM LIFT TRACTOR

(71) Applicants: TSINGHUA UNIVERSITY, Beijing (CN); Nuctech Company Limited, Beijing (CN)

(72) Inventors: Yuan He, Beijing (CN); Jianmin Li, Beijing (CN); Hongqi Li, Beijing (CN); Yulan Li, Beijing (CN); Qiangqiang Wang, Beijing (CN); Yuanjing Li, Beijing (CN); Zhiqiang Chen, Beijing (CN); Li Zhang, Beijing (CN)

(73) Assignees: TSINGHUA UNIVERSITY, Beijing (CN); NUCTECH COMPANY LIMITED, Beijing (CN)

( * ) Notice: Subject to any disclaimer, the term of this patent is extended or adjusted under 35 U.S.C. 154(b) by 300 days.

(21) Appl. No.: 16/233,398

(22) Filed: Dec. 27, 2018

(65) Prior Publication Data
US 2019/0193691 A1   Jun. 27, 2019

(30) Foreign Application Priority Data

Dec. 27, 2017 (CN) .......................... 201711443720.5

(51) Int. Cl.
*B60S 13/00* (2006.01)
*B60S 5/00* (2006.01)
(Continued)

(52) U.S. Cl.
CPC ................ *B60S 13/00* (2013.01); *B66F 5/04* (2013.01); *B66F 7/14* (2013.01); *B66F 7/18* (2013.01);
(Continued)

(58) Field of Classification Search
CPC .... B60S 13/00; B60S 5/00; B66F 5/04; B66F 7/14; B66F 7/18; B66F 7/28; B62D 49/02; B62D 49/0692
See application file for complete search history.

(56) References Cited

U.S. PATENT DOCUMENTS 3,720,047 A * 3/1973 van der Lely ......... B62D 49/02
56/15.6
4,345,871 A * 8/1982 Kalif .................. A01D 87/0061
414/703
(Continued)

FOREIGN PATENT DOCUMENTS

CN         102530791 A      7/2012
CN         103626082 A      3/2014
(Continued)

*Primary Examiner* — Saul Rodriguez
*Assistant Examiner* — Ashley K Romano
(74) *Attorney, Agent, or Firm* — Scully, Scott, Murphy & Presser, P.C.

(57) ABSTRACT

A fork-arm lift tractor includes a vehicle body, a supporting plate disposed above the vehicle body, a lifting device for driving the supporting plate to be lifted, a front and rear fork-arm assemblies, a front and rear fork-arm drive assemblies. The front fork-arm assembly includes two front fork-arms rotatably disposed at the supporting plate. The rear fork-arm assembly includes two rear fork-arms rotatably disposed at the supporting plate, and the front and rear fork-arms may be deployed or retracted from both sides of the supporting plate. The front fork-arm driving assembly includes a front transmission part, and a front power device disposed at the supporting plate and may drive the front transmission part to move horizontally linearly so as to rotate the two front fork-arms. The rear fork-arm driving assembly has almost the same structure of the front fork-arm driving assembly and is used to rotate the two rear fork-arms.

16 Claims, 6 Drawing Sheets

(51) Int. Cl.
    *B66F 7/18*           (2006.01)
    *B66F 7/28*           (2006.01)
    *B66F 5/04*           (2006.01)
    *B66F 7/14*           (2006.01)
    *B62D 49/06*         (2006.01)
    *B62D 49/02*         (2006.01)

(52) U.S. Cl.
    CPC . *B66F 7/28* (2013.01); *B60S 5/00* (2013.01); *B62D 49/02* (2013.01); *B62D 49/0692* (2013.01)

(56) References Cited

U.S. PATENT DOCUMENTS

| | | | | |
|---|---|---|---|---|
| 4,424,982 A * | 1/1984 | Weiss | | B62D 49/065 280/461.1 |
| 4,585,084 A * | 4/1986 | van der Lely | | B62D 49/002 172/125 |
| 4,887,680 A * | 12/1989 | Nozaka | | A01B 71/063 180/53.3 |
| 4,940,096 A * | 7/1990 | Johnson | | A01B 59/043 172/443 |
| 5,423,394 A | 6/1995 | Kendle | | |
| 5,647,441 A * | 7/1997 | Gibbons | | A01B 59/068 172/439 |
| 5,746,275 A * | 5/1998 | Cross | | A01B 59/068 172/246 |
| 6,048,161 A * | 4/2000 | Merlo | | A01B 51/026 414/680 |
| 6,148,928 A * | 11/2000 | Spears | | A01B 59/068 172/439 |
| 6,227,304 B1 * | 5/2001 | Schlegel | | A61P 35/00 172/439 |
| 6,257,347 B1 * | 7/2001 | Campisi | | A01B 59/068 172/439 |
| 6,390,764 B1 * | 5/2002 | Merlo | | A01B 51/026 414/680 |
| 6,796,384 B1 * | 9/2004 | Potter | | A01B 59/068 172/439 |
| 7,100,704 B2 * | 9/2006 | Potter | | A01B 59/068 172/439 |
| 7,174,967 B2 * | 2/2007 | Raimondo | | A01B 59/068 172/439 |
| 7,311,297 B1 * | 12/2007 | Bradshaw | | B66D 3/18 254/271 |
| 7,658,235 B2 * | 2/2010 | Dahl | | E02F 9/0891 172/449 |
| 7,686,097 B2 * | 3/2010 | Mozingo | | A01B 59/041 172/450 |
| 7,845,286 B2 * | 12/2010 | Hu | | G01V 5/0008 104/162 |
| 8,382,207 B2 * | 2/2013 | Altemeier | | G05G 11/00 298/22 P |
| 9,155,239 B2 * | 10/2015 | Hatanaka | | A01B 59/068 |
| 10,233,062 B2 * | 3/2019 | Cheng | | B66F 7/28 |
| 2008/0185230 A1 * | 8/2008 | Kyotani | | B66F 7/02 187/215 |
| 2010/0025058 A1 * | 2/2010 | Carter | | A01B 59/06 172/817 |
| 2011/0240393 A1 * | 10/2011 | Hurd | | B60G 21/0551 180/233 |
| 2015/0260283 A1 * | 9/2015 | Iida | | F16H 61/26 74/473.17 |
| 2017/0362068 A1 * | 12/2017 | Cheng | | B66F 7/0633 |

FOREIGN PATENT DOCUMENTS

| | | |
|---|---|---|
| CN | 205314637 U | 6/2016 |
| CN | 108100058 A | 6/2018 |
| CN | 207773292 U | 8/2018 |

\* cited by examiner

FORK-ARM LIFT TRACTOR

CROSS REFERENCE

This application is based upon and claims priority to Chinese Patent Application No. 201711443720.5, filed on Dec. 27, 2017, the entire contents thereof are incorporated herein by reference.

TECHNICAL FIELD

The present disclosure relates to a fork-arm lift tractor.

BACKGROUND

At present, in the field such as vehicle safety inspection, vehicle maintenance and traffic management, it is often necessary to move a vehicle to be detected, a vehicle that has malfunctions, or a vehicle that occupies road without starting the vehicle. The tractor is an indispensable traction tool for moving the vehicle. The existing tractor generally includes such as a vehicle body, a supporting plate and a plurality of fork-arms, wherein the vehicle body can move on the ground or in a special passage; the supporting plate is disposed on the vehicle body and can be lifted under the driving of a cylinder, the plurality of fork-arms can be horizontally disposed on the supporting plate, and the fork-arms can be driven to rotate in a horizontal plane by drive devices such as several motors, so that the fork-arms can deploy the vehicle body to lift wheels of the vehicle to be moved.

The above information disclosed in this background section is only intended to enhance understanding of the background of the present disclosure, and thus it may include information that does not constitute the prior art known to those of ordinary skill in the art.

SUMMARY

In accordance with one aspect of the present disclosure, a fork-arm lift tractor includes a vehicle body, a supporting plate, a lifting device, a front fork-arm assembly, a rear fork-arm assembly, a front fork-arm driving assembly, and a rear fork-arm driving assembly. The vehicle body may be disposed within a passage. The supporting plate is disposed above the vehicle body. The lifting device is disposed between the vehicle body and the supporting plate for driving the supporting plate to be lifted. The front fork-arm assembly includes two front fork-arms disposed on the supporting plate, wherein the two front fork-arms are respectively disposed at two sides of a longitudinal centerline of the vehicle body and rotatable on an upper surface of the supporting plate to deploy or retract from both sides of the supporting plate. The rear fork-arm assembly includes two rear fork-arms disposed on the supporting plate, wherein the two rear fork-arms are respectively disposed at two sides of the longitudinal centerline and rotatable on the upper surface of the supporting plate to deploy or retract from both sides of the supporting plate. The front fork-arm driving assembly includes a front transmission part and a front power device disposed on the supporting plate, wherein the front transmission part is connected with the two front fork-arms, the front power device is used to drive the front transmission part to move horizontally linearly in order to bring the two front fork-arms to rotate, and a central axis of the front power device coincides with or parallels to the longitudinal centerline. The rear fork-arm driving assembly includes a rear transmission part and a rear power device disposed on the supporting plate, wherein the rear transmission part is connected with the two rear fork-arms, the rear power device is used to drive the rear transmission part to move horizontally linearly to bring the two rear fork-arms to rotate, and a central axis of the rear power device coincides with or parallel to the longitudinal centerline.

According to an embodiment of the present disclosure, the front fork-arms are each provided with a front gear portion, and the front transmission part is provided with a front rack portion meshing with the front gear portions.

According to an embodiment of the present disclosure, the front gear portion and the corresponding front fork-arm are in an integrated structure, the front transmission part and the front rack portion are in an integrated structure.

According to an embodiment of the present disclosure, the rear fork-arms are each provided with a rear gear portion, and the rear transmission part is provided with a rear rack portion meshing with the rear gear portions.

According to an embodiment of the present disclosure, the rear gear portion and the corresponding rear fork-arm are in an integral structure, the rear transmission part and the rear rack portion are in an integrated structure.

According to an embodiment of the present disclosure, the front fork-arm driving assembly further includes a front guide member, the front guide member is disposed at the supporting plate and located between the two front fork-arms, and the front transmission part is slidably fitted to the front guide member.

According to an embodiment of the present disclosure, the rear fork-arm driving assembly further includes a rear guide member, the rear guide member is disposed at the supporting plate and located between the two rear fork-arms, and the rear transmission part is slidably fitted to the rear guide member.

According to an embodiment of the present disclosure, one or more of the lifting device, the front power device and the rear power device are hydraulic cylinders, air cylinders or linear motors.

According to an embodiment of the present disclosure, the front fork-arm assembly includes two front rotation shafts, the two front rotation shafts are rotatably disposed through the vehicle body and vertically pass through the supporting plate to connect with the two front fork-arms in a one-to-one correspondence, and the front rotation shaft is capable of moving vertically with the supporting plate.

According to an embodiment of the present disclosure, the rear fork-arm assembly includes two rear rotation shafts, the two rear rotation shafts are rotatably disposed through the vehicle body and vertically pass through the supporting plate to connect with the two rear fork-arms in a one-to-one correspondence, and the front rotation shaft is capable of moving vertically with the supporting plate.

According to an embodiment of the present disclosure, each of the front rotation shafts is provided with two front flanges in the axial direction, and the supporting plate is limited between the two front flanges.

According to an embodiment of the present disclosure, each of the rear rotation shafts is provided with two rear flanges in the axial direction, and the supporting plate is limited between the two rear flanges.

According to an embodiment of the present disclosure, the vehicle body includes two longitudinal beams, two transverse beams connected between the two longitudinal beams, and a mount comprising a top plate and a bottom plate arranged in parallel and connected to each other. The top plate is detachably connected to the two transverse beams, the lifting device is disposed at the bottom plate and passes through the top plate to connect with the supporting plate, and the front rotation shaft is rotatably connected to the bottom plate and passes through the top plate to connect with the supporting plate.

According to an embodiment of the present disclosure, the vehicle body includes two longitudinal beams, two transverse beams connected between the two longitudinal beams, and a mount comprising a top plate and a bottom plate arranged in parallel and connected to each other. The top plate is detachably connected to the two transverse beams, the lifting device is disposed at the bottom plate and passes through the top plate to connect with the supporting plate, and each of the rear rotation shaft is rotatably connected to the bottom plate and passes through the top plate to connect with the supporting plate.

According to an embodiment of the present disclosure, the fork-arm lift tractor further includes a traction driving device and a plurality of wheels, wherein the plurality of the wheels are symmetrically disposed at a bottom of the vehicle body and are capable of fitting to a guide rail in the passage in a rolling manner. The traction driving device is disposed at the vehicle body and is connected with the plurality of wheels in a transmission manner for driving the plurality of wheels to roll along the guide rail.

According to an embodiment of the present disclosure, the plurality of wheels includes front and rear wheels, the traction driving device includes front and rear motors, the front motor is connected with the front wheel through a front transmission assembly for driving the front wheel to rotate, and the rear motor is connected with the rear wheel through a rear transmission assembly for driving the rear wheel to rotate.

BRIEF DESCRIPTION OF THE DRAWINGS

The above and other features and advantages of the present disclosure will become more apparent from the detailed description of the exemplary embodiments with reference to the accompanying drawings.

Figure 1:
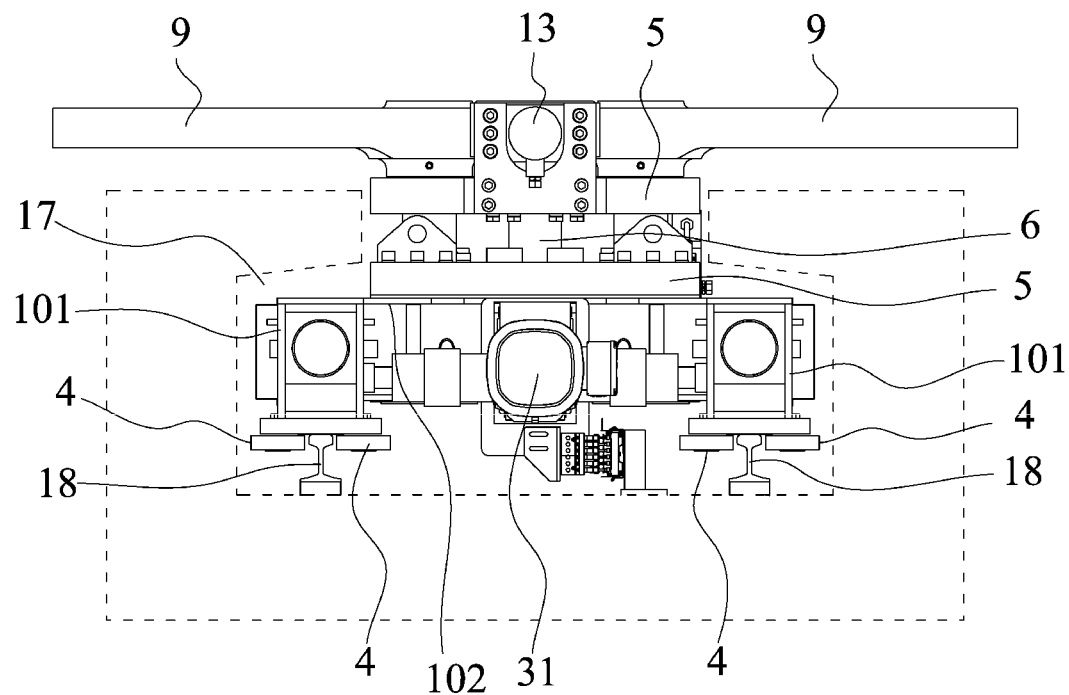
FIG. 1 is a side view of the fork-arm lift tractor in the passage according to an embodiment of the present disclosure.

In the figures: 1: vehicle body; 101: longitudinal beam; 102: transverse beam; 103: mount; 1031: top plate; 1032: bottom plate; 2: wheel; 3: traction driving device; 31: front motor; 32: rear motor; 4: guide wheel; 5: supporting plate; 6: lifting device; 7: front rotation shaft; 71: front flange; 8: rear rotation shaft; 9: front fork-arm; 10: rear fork-arm; 11: front guide member; front transmission part; 13: front power device; 14: rear guide member; 15: rear transmission part; 16: rear power device; 17: passage; 18: guide rail.

DETAILED DESCRIPTION

Example embodiments will now be described more fully with reference to the accompanying drawings. However, the example embodiments can be embodied in a variety of forms, and should not be construed as being limited to the embodiments set forth herein; rather, these embodiments are provided so that this disclosure will be thorough and complete, and the concepts of the example embodiments will be fully given to those skilled in the art. The same reference numerals in the drawings denote the same or similar structures, and thus their detailed descriptions will be omitted.

Although the relative terms such as "on", "below", "upper" and "lower" are used in the specification to describe the relative relationship of one component to another component, these terms are used in this specification for convenience only, for example, a direction in the example according to the accompanying drawings. It should be understood that if the device is turned upside down, the "upper" component described above will become a "lower" component. Other relative terms such as "top", "bottom", "front" and "rear" also have similar meanings. When a structure is "on" another structure, it is possible that the structure is integrally formed on another structure, or that the structure is "directly" disposed on another structure, or that the structure is "indirectly" disposed on the other structure through other structures.

The terms such as "a", "an", "the" and "said" are used to indicate the presence of one or more elements/components; the terms "comprise", "include", "have", "contain" and their variants are used to be open-type and are meant to include additional elements/components, etc., in addition to the listed elements/components/etc.; the terms "first", "second", etc. are used only as marks, rather than limitation for the number of objects.

The existing tractor usually needs to use drive devices such as a plurality of motors or the like to drive a plurality of fork-arms in one-to-one correspondence, which makes a structure of the tractor more complicated and costly. At the same time, since the fork-arm needs to rotate in the horizontal plane, a drive device such as a motor needs to be vertically arranged, so that height of the tractor increases and it is difficult to lift the vehicle with a lower chassis, and the chassis of the vehicle tends to be interfered to cause damage to the vehicle during the tractor is travelling under the vehicle.

The fork-arm lift tractor of the present disclosure simultaneously drives two front fork-arms to rotate on the upper surface of the supporting plate through the front fork-arm driving assembly, and simultaneously drives two rear fork-arms to rotate on the upper surface of the supporting plate through the rear fork-arm driving assembly, so that the front fork-arm and the rear fork-arm may be deployed to deploy the supporting plate, and wheels of the vehicle to be pulled are clamped to facilitate lifting the vehicle; or the front fork-arm and the rear fork-arm may be deployed and folded together to be retracted to the supporting plate, so as to facilitate the vehicle body to travel under the vehicle; thereby, the number of drive devices for driving the fork-arms can be reduced, which is advantageous for simplifying the structure and reducing the cost.

The central axes of the front power device and the rear power device coincide with or parallel to the longitudinal centerline of the vehicle body, and can output power in a horizontal direction to drive the front transmission part and the rear transmission part to move horizontally linearly. Rotation of the front fork-arm is driven by horizontal linear movement of the front transmission part, and rotation of the rear fork-arm is driven by horizontal linear movement of the rear transmission part, thereby avoiding the use of a vertically arranged motor or the like to directly drive the front fork-arm and the rear fork-arm to rotate, which reduces the overall height, facilitates to lift the vehicle with a lower chassis and reduce risk of collision with the chassis.

By raising or lowering the supporting plate with the lifting device, the front fork-arm and the rear fork-arm can simultaneously be raised or lowered so as to simultaneously lift wheels of the vehicle. After wheels are lifted, the vehicle body can move along the passage in order to pull the vehicle to move without starting the vehicle.

As shown in FIGS. 1-10, an exemplary embodiment of the present disclosure provides a fork-arm lift tractor, which may include a vehicle body 1, wheels 2, a traction driving device 3, a guide wheel 4, a supporting plate 5, and a lifting device 6, a front fork-arm assembly, a rear fork-arm assembly, a front fork-arm driving assembly and a rear fork-arm driving assembly.

Figure 2:
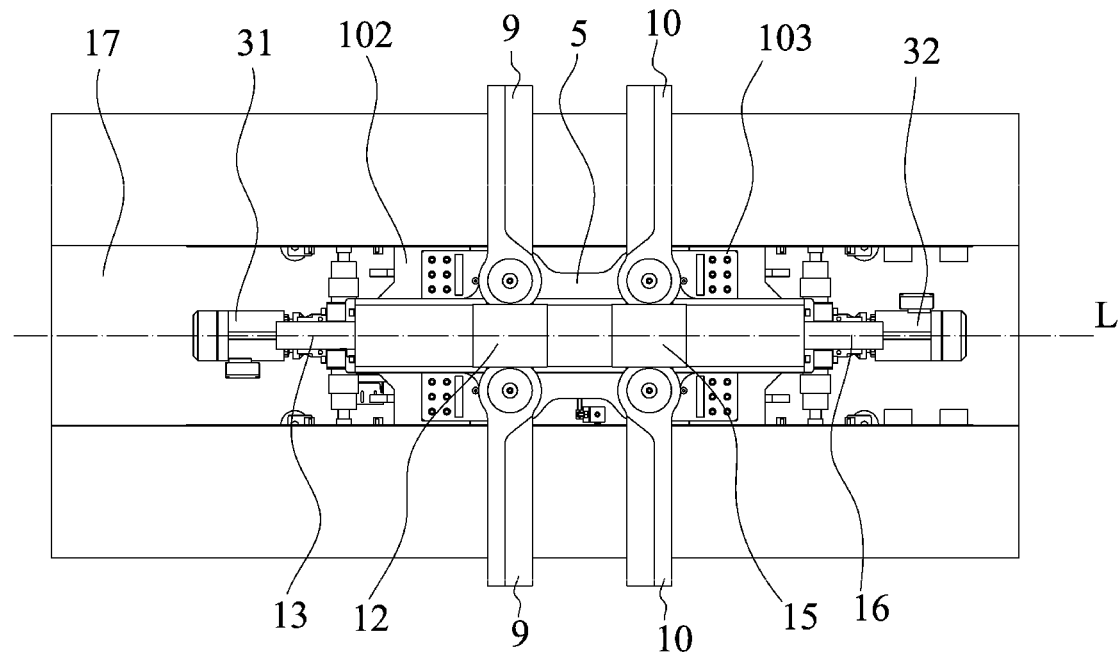
FIG. 2 is a top view of the fork-arm lift tractor in the passage according to an embodiment of the present disclosure.

As shown in FIG. 1 and FIG. 2, in an embodiment, the vehicle body 1 may be disposed within a predetermined passage 17 on the ground. The cross section of the passage 17 is not particularly limited herein as long as the vehicle body 1 may be accommodated. A guide rail 18 may be disposed in the passage 17, and for example, the number of guide rails may be two, specifically two guide rails parallel to each other. Two guide rails may be symmetric about a centerline of the passage 17, and the vehicle body 1 is slidably fitted to the two guide rails 18, and the longitudinal centerline L of the vehicle body 1 may be parallel to the centerline of the passage 17 so as to be linearly reciprocable in the passage 17 along the guide rail 18, and the longitudinal centerline L of the vehicle body 1 is the centerline of the vehicle body 1 along its traveling direction.

Figure 3:
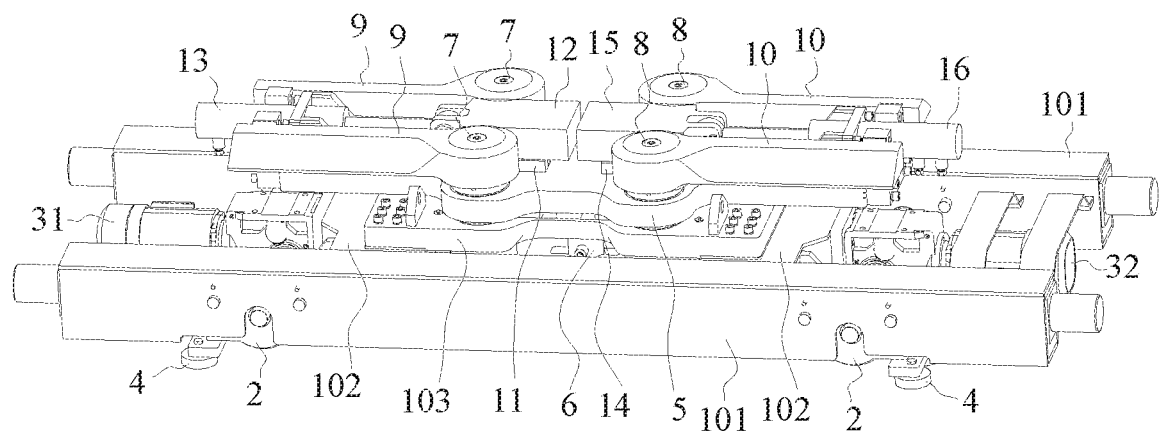
FIG. 3 is a schematic view of a fork-arm lift tractor according to an embodiment of the present disclosure.
Figure 4:
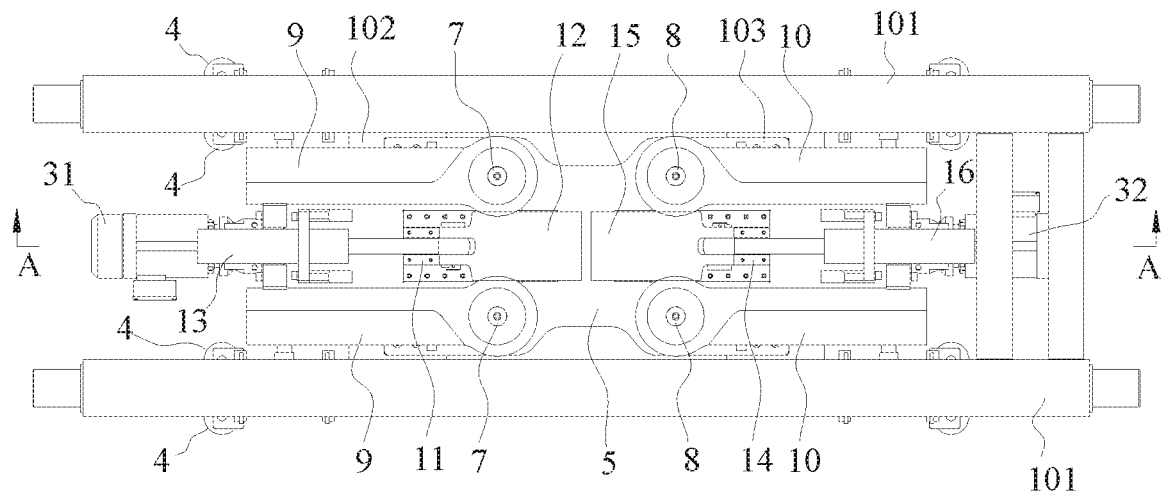
FIG. 4 is a top view of a fork-arm lift tractor in which a front fork-arm and a rear fork-arm are folded together according to the embodiment of the present disclosure.

As shown in FIG. 3 and FIG. 4, for example, the vehicle body 1 may include a longitudinal beam 101, a transverse beam 102, and a mount 103, wherein:

The number of longitudinal beams 101 may be two, and two longitudinal beams 101 are arranged in parallel and are symmetrical about the centerline of the passage 17, and both of the longitudinal beams 101 may be disposed in the passage 17. The shape of the cross section of the longitudinal beam 101 may be rectangular, circular, trapezoidal or the like.

The number of transverse beams 102 may also be two, and two transverse beams 102 are parallel to each other and disposed between two longitudinal beams 101, and for example, may be fixed to longitudinal beams 101 by welding, snapping or bolting, and there is a certain spacing between two transverse beams 102. Of course, the transverse beam 102 and the longitudinal beam 101 may also be in an integrated structure.

Figure 10:
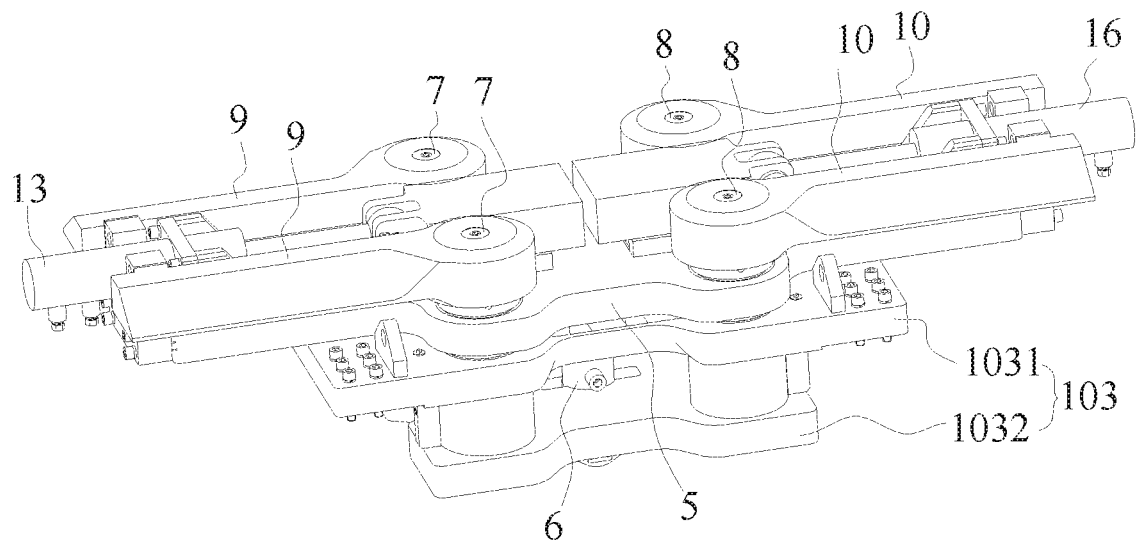
FIG. 10 is a schematic assembly view of a front fork-arm assembly, a rear fork-arm assembly, a supporting plate and a mount of a fork-arm lift tractor according to an embodiment of the present disclosure.

As shown in FIG. 3 and FIG. 10, the mount 103 may include a top plate 1031 and a bottom plate 1032 disposed in parallel, and the top plate 1031 is fixedly connected with the bottom plate 1032 with a certain spacing therebetween. The top plate 1031 may be larger than the bottom plate 1032. The top plate 1031 may be erected on two transverse beams 102, for example, may be fixedly connected with the transverse beam 102 in a detachable manner such as bolting or the like, and the top plate 1031 may be provided with a through hole for the lifting device 6 to pass through. The bottom plate 1032 is located below the top plate 1031, and the lifting device 6 may be connected to the bottom plate 1032 by welding, snapping, hinging or the like.

In other embodiments of the present disclosure, the vehicle body 1 may also be in the form of a flat structure or a frame structure, for example, as long as it may move in the passage 17, which will not be repeated herein.

As shown in FIG. 1 and FIG. 3, in an embodiment, the number of the wheels 2 may be plural, and the plurality of wheels 2 may be symmetrically disposed at the bottom of the vehicle body 1, and each of the wheels 2 has an axle, each axle is rotatably connected with the vehicle body 1. For example, the number of wheels 2 is four, including front and rear wheels, and each of two longitudinal beams 101 of the vehicle body 1 is provided with one front wheel and one rear wheel, and each wheel 2 may be engaged with the guide rail 18 and may roll on the guide rail 18 to realize movement of the vehicle body 1.

Figure 8:
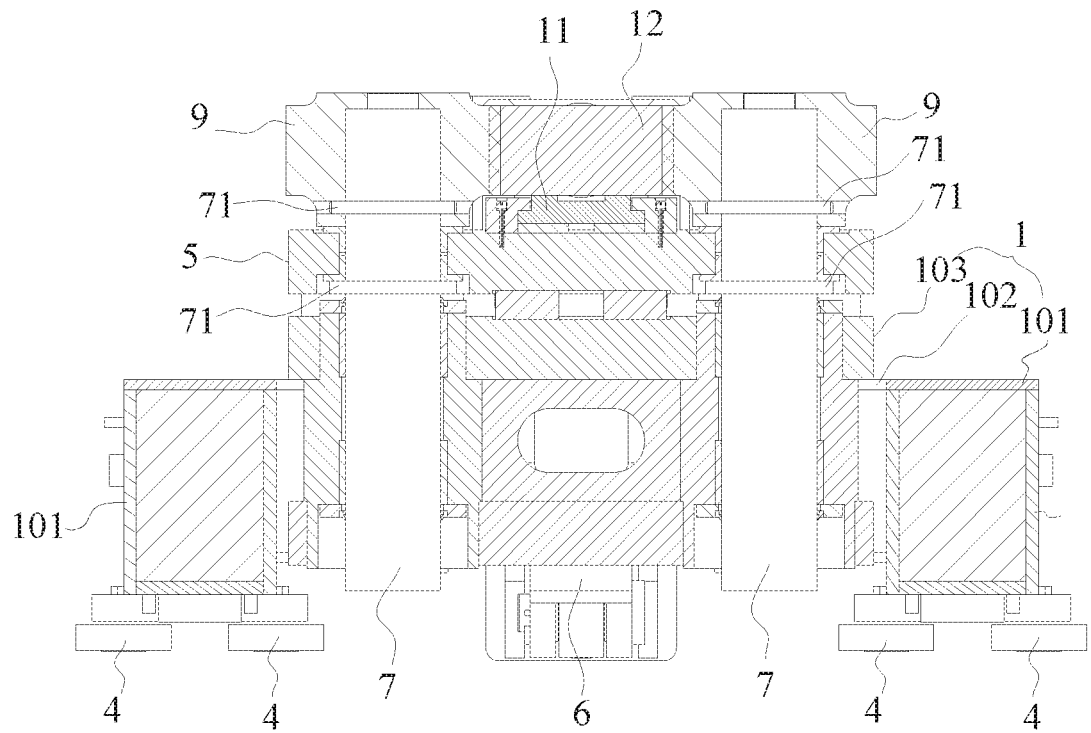
FIG. 8 is a cross-sectional view taken along line B-B of FIG. 7.

As shown in FIG. 1 and FIG. 8, in an embodiment, the number of guide wheels 4 is plural, and guide wheels 4 may be symmetrically disposed at the bottom of two longitudinal beams 101, and guide wheels 4 on any of longitudinal beams 101 may be symmetrically disposed about the guide rail 18 corresponding to the longitudinal beam 101. When the wheel 2 rolls along the guide rail, the guide wheel 4 on the longitudinal beam 101 may abut against both sides of the guide rail, so as to prevent the wheel 2 from being deflected and thus ensure the vehicle body 1 to be stable.

Figure 5:
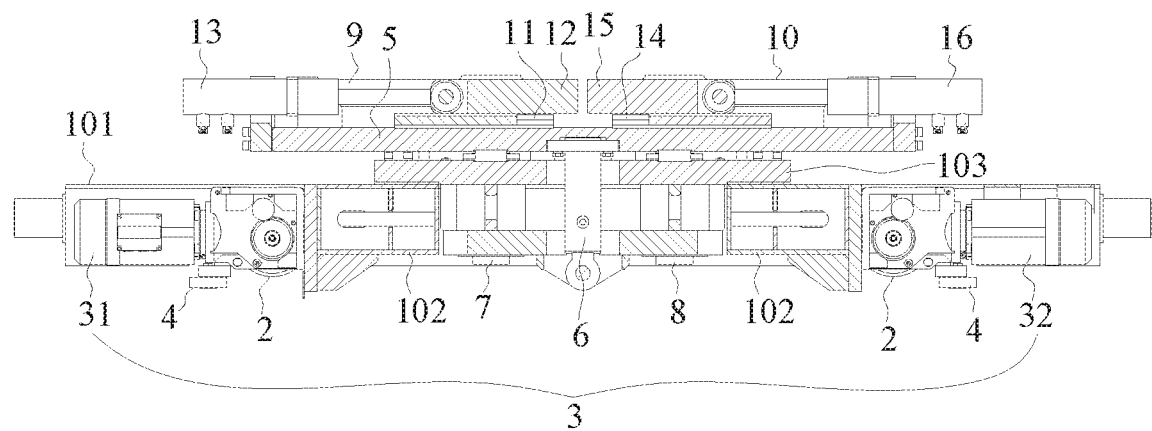
FIG. 5 is a cross-sectional view taken along line A-A of FIG. 4.
Figure 6:
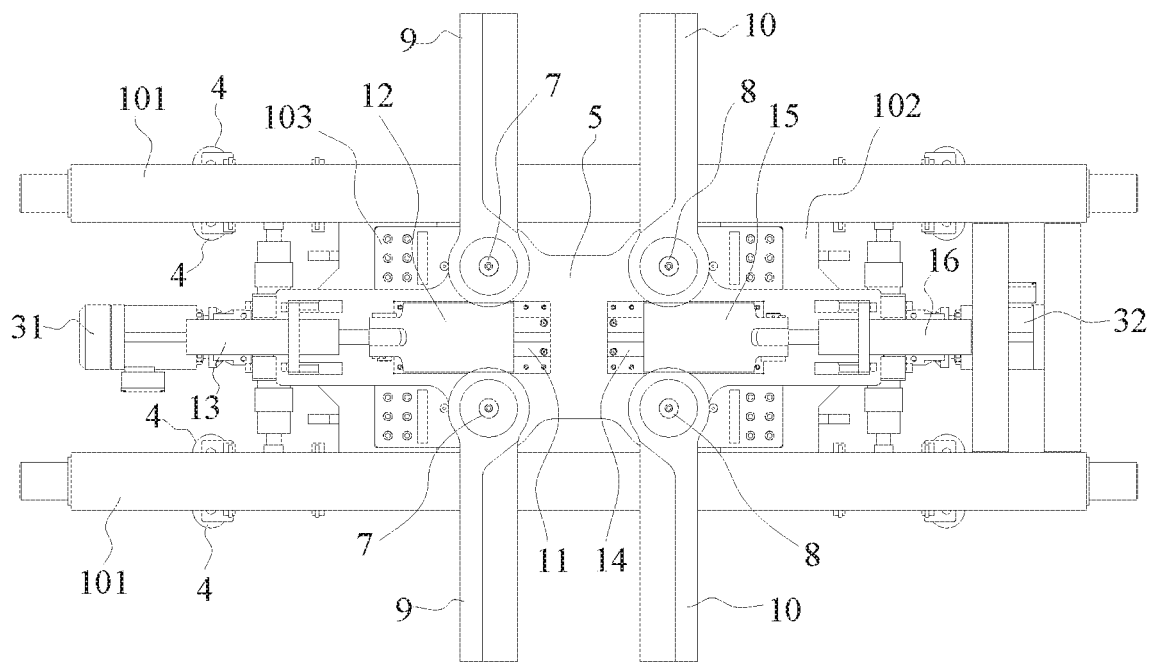
FIG. 6 is a top view of a fork-arm lift tractor in which a front fork-arm and a rear fork-arm are deployed according to the embodiment of the present disclosure.

As shown in FIGS. 3-5, in an embodiment, the traction driving device 3 may be connected with respective wheels 2 in a driving manner, and the respective wheels 2 may be driven to rotate by the traction driving device 3 to realize movement of the vehicle body 1. For example, the traction driving device 3 may include a front motor 31 and a rear motor 32. The front motor 31 may be connected with the axle of the front wheel via a front transmission assembly to drive the front wheel to rotate. The rear motor 32 may be connected with the axle of the rear wheel via the rear transmission assembly to drive the rear wheel to rotate, so that rotation of the wheel 2 may be controlled by controlling the front motor 31 and the rear motor 32 to realize movement of the vehicle body 1. At the same time, the front motor 31 and the rear motor 32 may be mounted to the longitudinal beam 101 or the transverse beam 102. The types of the front motor 31 and the rear motor 32 are not particularly limited herein. Each of the front transmission assembly and the rear transmission assembly may be a gear set including a plurality of gears. For details, reference may be made to the transmission manner in which the existing motor drives the wheel to rotate, and thus it will be described in detail.

Figure 7:
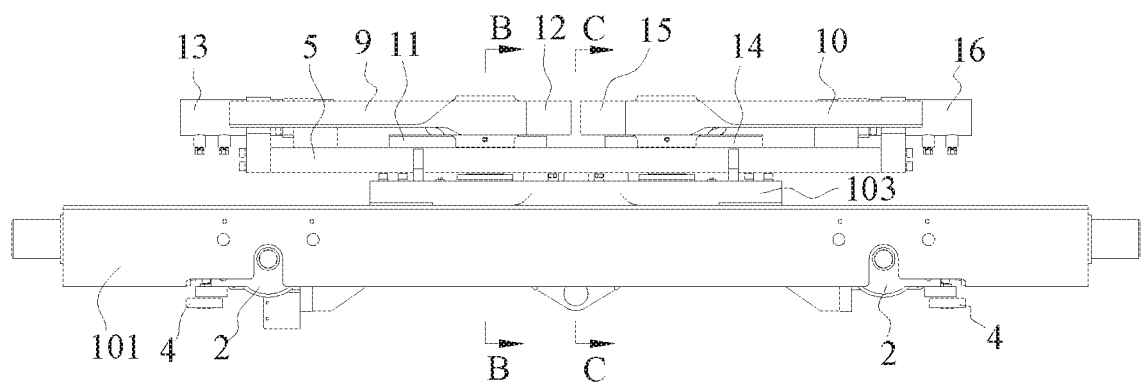
FIG. 7 is a front view of the fork-arm lift tractor of FIG. 4.

As shown in FIG. 3, FIG. 7 and FIG. 10, in an embodiment, the supporting plate 5 may be in a flat plate structure which may be disposed above the mount 103 of the vehicle body 1 and may face towards the mount 103. The supporting plate 5 may be provided with two front through holes and two rear through holes. The two front through holes may be symmetrically disposed at both sides of the longitudinal centerline L of the vehicle body 1, the two rear through holes may also be disposed at both sides of the longitudinal centerline L, and line connecting centers of the front through hole and the rear through hole located at the same side of the longitudinal centerline L is parallel to the longitudinal centerline L of the vehicle body 1.

Figure 9:
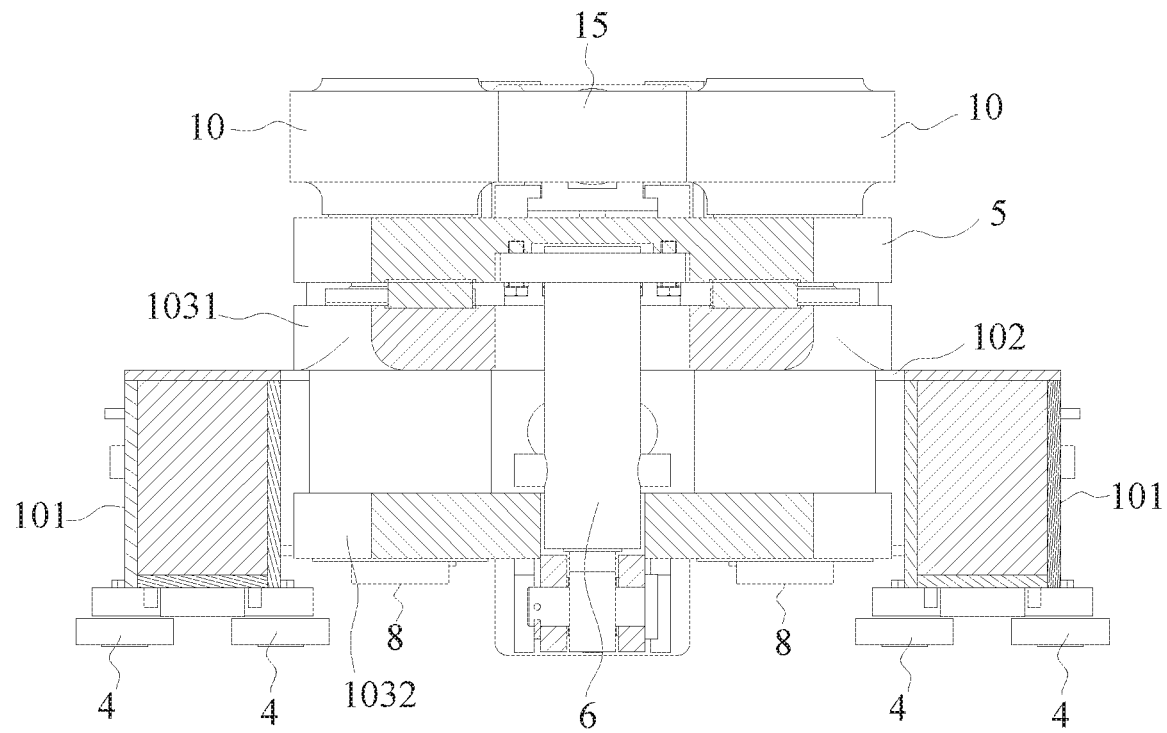
FIG. 9 is a cross-sectional view taken along line C-C of FIG. 7.
Figure 11:
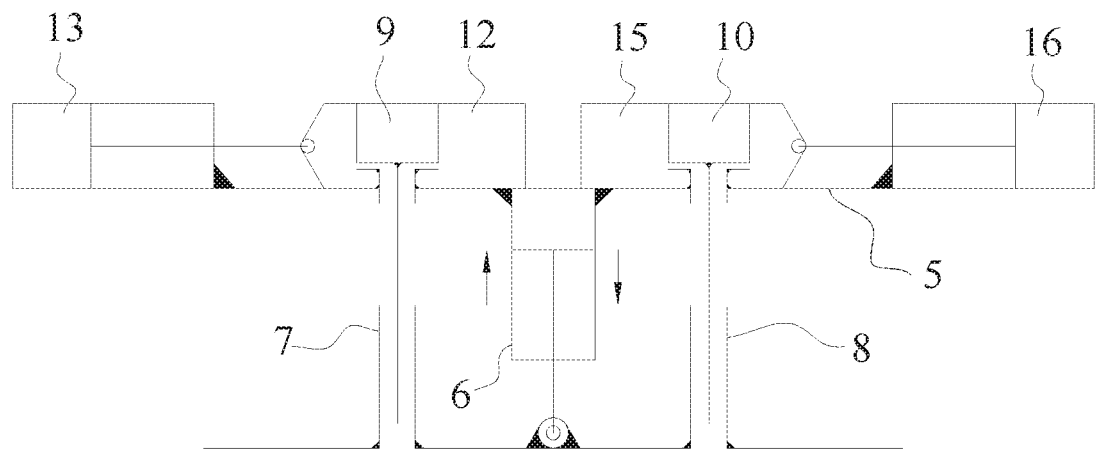
FIG. 11 is a schematic view of lifting of a supporting plate of a fork-arm lift tractor according to an embodiment of the present disclosure.

As shown in FIG. 5 and FIG. 9, in an embodiment, the lifting device 6 may be a hydraulic cylinder, which may have a cylinder body and a piston rod that may reciprocate within the cylinder body. The specific structure may refer to the existing hydraulic cylinder, and will not be described in detail herein. The cylinder body may be vertically fixed to the bottom plate 1032 of the mount 103 of the vehicle body 1 by welding, snapping, bolting or the like, or may be hinged to the bottom plate 1032. The piston rod may pass through the top plate 1031 and may be fixedly connected with the supporting plate 5 by welding or by bolting or the like. As shown in FIG. 11, the supporting plate 5 may vertically move by vertical movement of the piston rod, so as to realize lifting of the supporting plate 5. Of course, in other embodiments of the present disclosure, the lifting device 6 may also adopt a device such as a cylinder, a linear motor, or the like that may lift the supporting plate 5, or alternatively, a transmission assembly such as screw nut in combination with a motor may be used to realize lifting of the supporting plate 5, which will not be described herein.

As shown in FIGS. 3-6, in an embodiment, the front fork-arm assembly may include a front rotation shaft 7 and a front fork-arm 9; the rear fork-arm assembly may include a rear rotation shaft 8 and a rear fork-arm 10. Wherein:

The number of the front rotation shaft 7 and the rear rotation shaft 8 may be two, and each of the front rotation shaft 7 and the rear rotation shaft 8 is vertically disposed at the bottom plate 1032 of the mount 103 of the vehicle body 1 and is rotatably connected with the bottom plate 1032 so that both the front rotation shaft 7 and the rear rotation shaft 8 are rotatable relative to the vehicle body 1. At the same time, the front rotation shaft 7 and the rear rotation shaft 8 may also move vertically relative to the bottom plate 1032, and the two front rotation shafts 7 may be symmetrically disposed at both sides of the longitudinal centerline L of the vehicle body 1, and the rear rotation shaft 8 may be symmetrically disposed at both sides of the longitudinal centerline L, the line connecting the front rotation shaft 7 and the rear rotation shaft 8 located at the same side of the longitudinal centerline L is parallel to the longitudinal centerline L. In addition, the two front rotation shafts 7 may pass through the top plate 1031 of the mount 103, and may fit through the two front through holes of the supporting plate 5 in a one-to-one correspondence, and may rotate within the front through hole; the two rear rotation shafts 8 may also pass through the top plate 1031 and fit through the two rear through holes of the supporting plate 5 in a one-to-one correspondence, and may be rotated within the rear through hole. When the supporting plate 5 vertically moves under driving of the lifting device 6, the front rotation shaft 7 and the rear rotation shaft 8 are rotatable relative to the mount 103 and vertically move relative to the mount 103, so that the front rotation shaft 7 and the rear rotation shaft 8 may guide the supporting plate 5 to prevent it from being deflected.

As shown in FIG. 8, each of the front reels 7 may be provided with two front flanges 71, which may be distributed along the axial direction of the corresponding front rotation shaft 7, and a distance between the two front flanges 71 is not less than a thickness of the supporting plate 5. The supporting plate 5 is located between the two front flanges 71 so that the supporting plate 5 may be defined, and when the supporting plate 5 vertically moves, the front rotation shaft 7 may be driven to move synchronously. At the same time, each of the rear rotation shafts 8 may be provided with two rear flanges, two rear flanges may be distributed along the axial direction of the corresponding rear rotation shaft 8. The two rear flanges are flush with the two front flanges 71 in the one-to-one correspondence, and the supporting plate 5 may be defined between the two rear flanges. When the supporting plate 5 moves vertically, the rear rotation shaft 8 may be driven to move synchronously. For the specific structure of the rear flange, reference may be made to the front flange 71 in FIG. 8. In addition, a component such as a spacer or the like may be disposed between two front flanges 71 and two rear flanges and the supporting plate 5 to clamp the supporting plate 5, and a component such as a sleeve may be disposed on the front rotation shaft 7 and the rear rotation shaft 8 to reduce friction.

The number of front fork-arms 9 and rear fork-arms 10 may be two, and both are horizontally disposed on the supporting plate 5. The two front fork-arms 9 and the two rear fork-arms 10 are symmetrically disposed at both sides of the longitudinal centerline L of the vehicle body 1, so that one front fork-arm 9 and one rear fork-arm 10 are disposed at the same side of the longitudinal centerline L. The two front fork-arms 9 may be sleeved at one deployed end of front through hole of the two front rotation shafts 7 in the one-to-one correspondence, and may be rotated on the upper surface of the supporting plate 5 in the opposite direction to a position perpendicular to or parallel to the longitudinal centerline L with the front rotation shaft 7. The two rear fork-arms 10 may be sleeved at one deployed end of rear through hole of the two rear rotation shafts 8 in the one-to-one correspondence, and may be rotated on the upper surface of the supporting plate 5 in the opposite direction to a position perpendicular to or parallel to the longitudinal centerline L with the rear rotation shaft 8. In the case where the fork-arm lift tractor according to the present disclosure is horizontally mounted in the passage 17, the upper surface of the supporting plate 5 is a horizontal plane.

Figure 12:
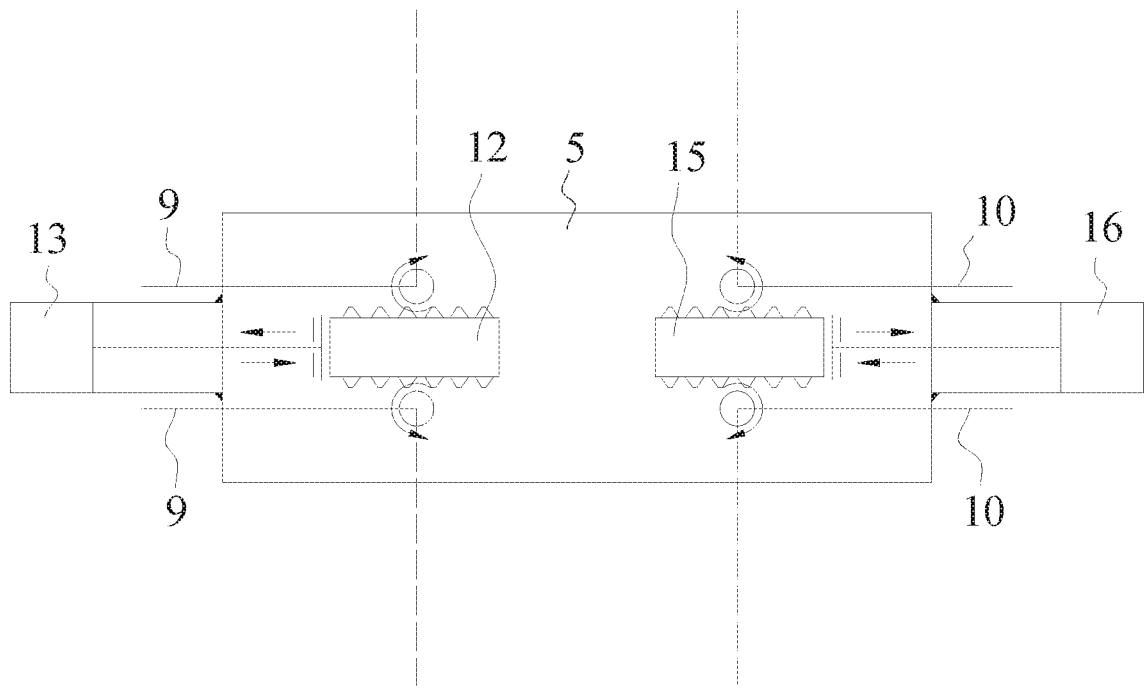
FIG. 12 is a schematic view of a fork-arm lift tractor in which a front fork-arm and a rear fork-arm are deployed and folded together according to an embodiment of the present disclosure.

As shown in FIG. 12, the broken line in FIG. 12 shows a state in which the front fork-arm 9 and the rear fork-arm 10 are rotated to a position perpendicular to the longitudinal centerline L of the vehicle body 1, i.e., a state in which the front fork-arm 9 and the rear fork-arm 10 are deployed. When both the front fork-arms 9 and the two rear fork-arms 10 are rotated to a position perpendicular to the longitudinal centerline L of the vehicle body 1, the two front fork-arms 9 are deployed from both sides of the supporting plate 5, and the two rear fork-arms 10 are also deployed from both sides of the supporting plate 5, and the front fork-arm 9 and the rear fork-arm 10 at the same side of the longitudinal centerline L may clamp the corresponding wheel of the vehicle to be pulled; when each of the front fork-arms 9 and the rear fork-arms 10 is rotated to a position parallel to the longitudinal centerline L of the vehicle body 1, the front fork-arms 9 and the rear fork-arms 10 may all be located above the supporting plate 5, so that the front fork-arms 9 and the rear fork-arms 10 are put together, which facilitates the vehicle body 1 to bring the supporting plate 5 to move under the vehicle to be pulled.

In addition, each of two front fork-arms 9 may be provided with a front gear portion coaxial with the front rotation shaft 7, and the front gear portion and the front fork-arm 9 may be in an integrated structure. In particular, the outer circumference surface of an end of the front fork-arm 9 connected to the front rotation shaft 7 may be a tooth surface structure of the gear. Of course, the front gear portion may also be a separate gear that is fixedly connected with the front fork-arm 9 or the front rotation shaft 7. Each of the two rear fork-arms 10 may be provided with a rear gear portion coaxial with the rear rotation shaft 8. The specific form of the rear gear portion may refer to the front gear portion, which will not be described in detail herein.

As shown in FIGS. 3-6, in an embodiment, the front fork-arm driving assembly may include a front guide member 11, a front transmission part 12, and a front power device 13, wherein:

The front guide member 11 may be a guide rail which may be fixed to the supporting plate 5 by welding, bolting or the like. The front guide member 11 may be horizontally disposed along a straight line parallel to the longitudinal centerline L of the vehicle body 1, and the front guide member 11 is disposed between the two front fork-arms 9 to separate the two front fork-arms 9 at two sides of the front guide member 11.

The front transmission part 12 may be a slider that is fitted to the front guide member 11 and reciprocally linearly movable along the front guide member 11. At the same time, two side surfaces of the front transmission part 12, i.e., each side directly facing towards two front fork-arms 9 may be provided with a front rack portion, and the front rack portion and the front transmission part 12 may be an integral structure or may be fixedly connected to a separate rack of the front transmission part 12. Front rack portions at both sides of the front transmission part 12 may be meshed with front gear portions of the two front fork-arms 9, so that the two front fork-arms 9 can be reciprocally rotated by reciprocally linear movement of the front transmission part 12 to enable the front fork-arms 9 to be deployed from or retracted to the supporting plate 5. During the above process, two front fork-arms 9 are rotated in opposite directions, i.e., when one front fork-arm 9 rotates counterclockwise, and the other front fork-arm 9 rotates clockwise.

The front power device 13 may be disposed at the front fork-arm 9 and away from a side of the rear fork-arm 10, and the center axis of the front power device 13 may coincide with or parallel to the longitudinal centerline L of the vehicle body 1. The front power device 13 may be a hydraulic cylinder, which may include a cylinder body and a piston rod, and the cylinder body thereof may be horizontally fixed to the supporting plate 5 by welding, snapping, bolting, or the like. The piston rod may also be horizontally disposed and fixedly connected with the front transmission part 12 welding, snapping, bolting or the like, and the central axis of the piston rod may parallel to or coincide with the longitudinal centerline L of the vehicle body 1, so that the front transmission part 12 may be driven by the front power device 13 to reciprocate linearly along the front guide 11, thereby making the two front fork-arms 9 to be rotated. Of course, in other embodiments of the present disclosure, the front power device 13 may also be a cylinder, a linear motor or the like, and lifting of the supporting plate 5 may be realized by a motor in combination with a transmission component such as a screw nut, which will not be described herein.

As shown in FIGS. 3-6, in an embodiment, the rear fork-arm driving assembly may include a rear guide member 14, a rear transmission part 15, and a rear power device 16, wherein:

The rear guide member 14 may be a guide rail which may be fixed to the supporting plate 5 by welding, bolting or the like, and may be horizontally disposed with the front guide member 11 in a straight line parallel to the longitudinal centerline L of the vehicle body 1. The rear guide member 14 is disposed between the two rear fork-arms 10 to separate the two rear fork-arms 10 at two sides of the rear guide member 14.

The rear transmission part 15 is fitted to the rear guide member 14 and is linearly reciprocally slidable along the rear guide member 14. A rear rack portion may be provided at each side surface of the rear transmission part 15, and the rear rack portions at both sides of the rear transmission part 15 may be meshed with rear gear portions of the two rear fork-arms 10 in the one-to-one correspondence, so that the rear transmission part 15 may bring the two rear fork-arms 10 to be reciprocally rotated in order to deploy the rear fork-arm 10 from and retract it to the supporting plate 5. The specific structure and mounting manner may refer to the front transmission part 12, which will not be described in detail herein.

The rear power device 16 may be disposed at the rear fork-arm 10 and away from a side of the front fork-arm 9, and the central axis of the rear power device 16 may also coincide with or parallel to the longitudinal centerline L of the vehicle body 1. The rear power device 16 may also be a hydraulic cylinder, a cylinder or a linear motor, etc., and may drive the rear transmission part 15 to reciprocate linearly along the front guide member 11 to rotate the two rear fork-arms 10. For details, reference may be made to the front power device 13, which will not be described in detail herein.

In an embodiment, the fork-arm lift tractor of the present disclosure may further include a control unit (not shown), and the control unit may be a programmable logic controller or a microcontroller such as a single chip microcomputer, which may control the lifting device 6, the front power device 13 of the front fork-arm driving assembly and the rear power device 16 of the rear fork-arm driving assembly to work, and the specific control principle may refer to the control mode of the power control device such as the hydraulic cylinder and the motor controlled by the existing microcontroller, which will not be described in detail herein.

The fork-arm lift tractor of the embodiment of the present disclosure may simultaneously drive two front fork-arms 9 to rotate by the front fork-arm driving assembly, and simultaneously drive two rear fork-arms 10 to rotate by the rear fork-arm driving assembly, so that deploying and retracting of the front fork-arm 9 and the rear fork-arm 10 may be realized to reduce the number of drive devices that drive fork-arms to rotate, which is advantageous for simplifying the structure and reducing the cost. At the same time, rotation of the front fork-arm 9 may be driven by horizontal linear movement of the front transmission part 12, and rotation of the rear fork-arm 10 may be driven by horizontal linear movement of the rear transmission part 15, so as to avoid vertically arrangement of the front power device 13 and the rear power device 16, facilitate reducing the overall height, facilitate lifting a vehicle with a lower chassis and reduce risk of collision with the chassis. In addition, the supporting plate 5 may be raised or lowered by the lifting device 6, so that the front fork-arm 9 and the rear fork-arm 10 may simultaneously be raised or lowered so as to simultaneously lift wheels of the vehicle. After wheels are lifted, the vehicle body 1 may move along the passage 17 to thereby pull the vehicle to move without starting the vehicle.

It should be understood that the present disclosure does not limit its application to the detailed structure and arrangement of the components mentioned in the specification. The present disclosure is capable of having other embodiments, and is capable of implementing and performing various embodiments. The foregoing variations and modifications are intended to fall within the scope of the present disclosure. It should be understood that the present disclosure disclosed and defined herein extends to all alternative combinations of two or more individual features that are mentioned or apparent in the text or drawings. All of these different combinations constitute various alternative aspects of the present disclosure. The embodiments described in the specification illustrate the best mode of the present disclosure, and will enable those skilled in the art to utilize the present disclosure.

What is claimed is:

1. A fork-arm lift tractor comprising:
   a vehicle body capable of being disposed in a passage;
   a supporting plate disposed above the vehicle body;
   a lifting device disposed on the vehicle body and configured to drive the supporting plate to be lifted;
   a front fork-arm assembly comprising two front fork-arms disposed on the supporting plate, the two front fork-arms being respectively disposed at two sides of a longitudinal centerline of the vehicle body and rotatable on an upper surface of the supporting plate to deploy or retract from both sides of the supporting plate;
   a rear fork-arm assembly comprising two rear fork-arms disposed on the supporting plate, the two rear fork-arms being respectively disposed at two sides of the longitudinal centerline and rotatable on the upper surface of the supporting plate to deploy or retract from both sides of the supporting plate;
   a front fork-arm driving assembly comprising a front transmission part and a front power device disposed on the supporting plate, the front transmission part being connected with the two front fork-arms, the front power device being configured to drive the front transmission part to move horizontally linearly in order to bring the two front fork-arms to rotate, and a central axis of the front power device coinciding with or paralleling to the longitudinal centerline; and
   a rear fork-arm driving assembly comprising a rear transmission part and a rear power device disposed on the supporting plate, the rear transmission part being connected with the two rear fork-arms, the rear power device being configured to drive the rear transmission part to move horizontally linearly in order to bring the two rear fork-arms to rotate, and a central axis of the rear power device coinciding with or paralleling to the longitudinal centerline,
   wherein:
   the lifting device is disposed under the supporting plate, and
   the front fork-arm assembly, the rear fork-arm assembly, the front fork-arm driving assembly and the rear fork-arm driving assembly are all disposed over the supporting plate.

2. The fork-arm lift tractor according to claim 1, wherein the front fork-arms are each provided with a front gear portion, and the front transmission part is provided with a front rack portion meshing with the front gear portions.

3. The fork-arm lift tractor according to claim 2, wherein the front gear portion and the corresponding front fork-arm are in an integrated structure, the front transmission part and the front rack portion are in an integrated structure.

4. The fork-arm lift tractor according to claim 1, wherein the rear fork-arms are each provided with a rear gear portion, and the rear transmission part is provided with a rear rack portion meshing with the rear gear portions.

5. The fork-arm lift tractor according to claim 4, wherein the rear gear portion and the corresponding rear fork-arm are in an integral structure, the rear transmission part and the rear rack portion are in an integrated structure.

6. The fork-arm lift tractor according to claim 1, wherein the front fork-arm driving assembly further comprises a front guide member, the front guide member being disposed at the supporting plate and located between the two front fork-arms, and the front transmission part being slidably fitted to the front guide member.

7. The fork-arm lift tractor according to claim 1, wherein the rear fork-arm driving assembly further comprises a rear guide member, the rear guide member being disposed at the supporting plate and located between the two rear fork-arms, and the rear transmission part being slidably fitted to the rear guide member.

8. The fork-arm lift tractor according to claim 1, wherein one or more of the lifting device, the front power device and the rear power device are hydraulic cylinders, air cylinders or linear motors.

9. The fork-arm lift tractor according to claim 1, wherein the front fork-arm assembly comprises two front rotation shafts, the two front rotation shafts being rotatably disposed through the vehicle body and vertically passing through the supporting plate to connect with the two front fork-arms in a one-to-one correspondence, and the front rotation shaft being capable of moving vertically with the supporting plate.

10. The fork-arm lift tractor according to claim 1, wherein the rear fork-arm assembly comprises two rear rotation shafts, the two rear rotation shafts being rotatably disposed through the vehicle body and vertically passing through the supporting plate to connect with the two rear fork-arms in a one-to-one correspondence, and the front rotation shaft being capable of moving vertically with the supporting plate.

11. The fork-arm lift tractor according to claim 9, wherein each of the front rotation shafts is provided with two front flanges in an axial direction of the front rotation shaft, and the supporting plate is limited between the two front flanges.

12. The fork-arm lift tractor according to claim 9, wherein the vehicle body comprises two longitudinal beams, two transverse beams connected between the two longitudinal beams, and a mount comprising a top plate and a bottom plate arranged in parallel and connected to each other, the top plate being detachably connected to the two transverse beams, the lifting device being disposed at the bottom plate and passing through the top plate to connect with the supporting plate, and the front rotation shaft being rotatably connected to the bottom plate and passing through the top plate to connect with the supporting plate.

13. The fork-arm lift tractor according to claim 10, wherein each of the rear rotation shafts is provided with two rear flanges in an axial direction of the rear rotation shaft, and the supporting plate is limited between the two rear flanges.

14. The fork-arm lift tractor according to claim 10, wherein the vehicle body comprises two longitudinal beams, two transverse beams connected between the two longitudinal beams, and a mount comprising a top plate and a bottom plate arranged in parallel and connected to each other, the top plate being detachably connected to the two transverse beams, the lifting device being disposed at the bottom plate and passing through the top plate to connect with the supporting plate, and each of the rear rotation shaft being rotatably connected to the bottom plate and passing through the top plate to connect with the supporting plate.

15. The fork-arm lift tractor according to claim 1, wherein the fork-arm lift tractor further comprises:
- a plurality of wheels symmetrically disposed at a bottom of the vehicle body and capable of fitting to a guide rail in the passage in a rolling manner;
- a traction driving device disposed at the vehicle body and connected with the plurality of wheels for driving the plurality of wheels to roll along the guide rail.

16. The fork-arm lift tractor according to claim 15, wherein the plurality of wheels comprises front and rear wheels, the traction driving device comprising front and rear motors, the front motor being connected with the front wheel through a front transmission assembly for driving the front wheel to rotate, and the rear motor being connected with the rear wheel through a rear transmission assembly for driving the rear wheel to rotate.

* * * * *